United States Patent
Marcej

(10) Patent No.: US 12,504,735 B1
(45) Date of Patent: Dec. 23, 2025

(54) Z-AXIS SETTING TOOL

(71) Applicant: Daniel J. Marcej, Mount Pleasant, PA (US)

(72) Inventor: Daniel J. Marcej, Mount Pleasant, PA (US)

(*) Notice: Subject to any disclaimer, the term of this patent is extended or adjusted under 35 U.S.C. 154(b) by 548 days.

(21) Appl. No.: 17/988,040

(22) Filed: Nov. 16, 2022

(51) Int. Cl.
*G05B 19/402* (2006.01)

(52) U.S. Cl.
CPC .. *G05B 19/402* (2013.01); *G05B 2219/34015* (2013.01)

(58) Field of Classification Search
CPC ...................................... G05B 19/402
USPC ............................. 33/626, 533, 645; 73/1.79
See application file for complete search history.

(56) References Cited

U.S. PATENT DOCUMENTS

| | | | | |
|---|---|---|---|---|
| 4,117,752 A * | 10/1978 | Yoneda | F16P 3/12 | 83/62.1 |
| 4,321,442 A * | 3/1982 | Tanaka | H01H 9/16 | 200/296 |
| 4,334,363 A * | 6/1982 | Stegemeyer | G01B 3/303 | 33/784 |
| 4,531,436 A * | 7/1985 | Antonissen | B26D 5/20 | 83/88 |
| 4,687,885 A * | 8/1987 | Talmage, Jr. | G06F 3/045 | 178/18.05 |
| 4,826,370 A * | 5/1989 | Conradsson | G05B 19/18 | 33/642 |
| 4,881,858 A * | 11/1989 | Volk | G05B 19/18 | 33/642 |
| 4,882,849 A * | 11/1989 | Amir | G01B 5/02 | 33/640 |
| 5,080,104 A * | 1/1992 | Marks | A61B 5/065 | 604/116 |
| 7,237,708 B1 * | 7/2007 | Guy | A61B 17/072 | 227/176.1 |
| 7,252,466 B1 * | 8/2007 | Roch | G05B 19/4015 | 409/187 |
| 9,358,072 B2 * | 6/2016 | Ullrich | A61B 34/70 | |
| 10,865,941 B2 * | 12/2020 | Lewis | H02K 11/26 | |
| 11,384,901 B2 * | 7/2022 | Pellenc | A01G 3/037 | |
| 2024/0377803 A1 * | 11/2024 | Fridland | G05B 19/402 | |

FOREIGN PATENT DOCUMENTS

| KR | 200442320 Y1 * | 10/2008 | ......... B23Q 17/2208 |
|---|---|---|---|
| KR | 20110009142 U * | 9/2011 | ........... B23Q 1/0054 |

* cited by examiner

*Primary Examiner* — Peter J Macchiarolo
*Assistant Examiner* — Anna Josephine Saunders
(74) *Attorney, Agent, or Firm* — Cramer Patent & Design; Aaron R. Cramer

(57) ABSTRACT

A Z-axis setting tool is a Z-axis calibration device for a CNC machine. The setting tool has an indicator light that is triggered when a cutting tool reaches a certain and specific depth. The device is activated by a precision switch which illuminates an LED indicator light when placed between the material to be machined and the cutting tool.

2 Claims, 7 Drawing Sheets

Z-AXIS SETTING TOOL

RELATED APPLICATIONS

Non-applicable.

FIELD OF THE INVENTION

The presently disclosed subject matter is directed to a calibration tool and more specifically to a Z-axis setting tool for a CNC machine.

BACKGROUND OF THE INVENTION

Precision cutting and machining tools have been utilized by machinists and fabricators since the dawn of the industrial revolution. Oftentimes large and heavy, such tools historically required a high degree of skill and precision in order to create a given cut, drill hole, etching etc. In modern times, the degree of accuracy and speed of such tools has been enhanced by what is commonly referred to as a CNC machine tool. A CNC (Computer Numeric Control) machine tool enables a user to machine a given piece of material with a degree of precision and easy replication that historically was not obtainable utilizing traditional manual methods.

While capable of precise highly detailed cuts which are easily replicated over the course of numerous pieces of a given material, the CNC machine is only as accurate as the calibration it receives prior to activation. Essentially, if a Z-axis of the CNC machine is off or not properly adjusted the CNC machine is capable of cutting through the work material or produces an inaccurate cutting depth thereby either damaging the cutting tool and/or ruining the work material.

While there are several Z-axis setting devices in prior art which provide a means to set a Z-axis of a CNC machine- such devices lack flat bottoms, clear indicators and must often be individually calibrated. Therefore, a need exists for a device which enables a user to precisely set a Z-axis of a CNC machine in a method and manner which is consistent and easily used. The development of the Z-axis setting tool fulfills this need in a manner which is accurate and cost effective.

SUMMARY OF THE INVENTION

The present invention provides for a Z-axis setting device has a housing having a rear wall, a left side wall, a right side wall, a bottom wall, a top wall, a hollow cavity, and a cover plate disposed on a front portion of the housing—the housing also includes a circuit cavity which is disposed within the hollow interior of the housing, a contact pin is slidably coupled to the housing, the contact pin is free to move up and down through an aperture located on the top wall of the housing and emerges from on top of the housing and extends above the top wall of the housing, an LED lamp illuminates at a predetermined distance defined by the contact pin, and a battery having one or more energy-storage devices serving as a source of electrical energy to operate the LED and a contact spring having a contact spring mount, a positive battery terminal tang, a contact armature, and an adjustment armature.

The contact pin includes a groove that may transversely encircle the contact pin. A retaining clip may be coupled to the groove such that a main spring pushes up against the retaining clip in order to lift the contact pin. The main spring may be positioned within the circuit cavity between a spring plate and the retaining clip. The main spring may push the contact pin up such that the retaining clip presses on top of the circuit cavity. The retaining clip may limit downward motion of the contact pin such that damage to the contact spring from downward movement of the contact pin is prevented. An external force may push down on the contact pin to force the contact pin to move down into contact with the contact spring in order to complete an electrical path through the electrical circuit causing the LED lamp to illuminate.

The LED lamp may be energized by pressing the contact pin down against the contact spring to complete the electrical path indicating that the distance from the bottom of the housing to on top of the contact pin that matches the predetermined distance. The contact pin may include a vertically-oriented cylindrical rod. The battery may reside in a battery cavity of a battery insert and is accessible by removing the cover plate from the housing. The positive battery terminal tang may extend forward through the battery insert such that the positive battery terminal tang makes contact with a positive case of the battery. The contact pin may be pushed downwards to make contact with the contact armature, thus completing an electrical path between the contact pin and the positive case of the battery.

The contact armature may extend upwards from a left side of the contact spring at an oblique angle such that the end of the contact armature is positioned below the contact pin. A battery insulator may electrically insulate the battery from the cover plate. The contact spring mount retains the contact spring in place within the circuit cavity. The adjustment armature may extend to the contact spring mount and then upwards adjacent to the left side wall of the housing.

The upper end of the adjustment armature may be positioned adjacent to an adjustment aperture that is located on the left side wall of the housing. A calibration screw may threadedly couple to the adjustment aperture, the calibration screw pushes against the adjustment armature to raise and lower the point where the contact pin contacts the contact armature. The calibration screw may be turned in a first rotational direction to move the calibration screw into the housing such that the calibration screw pushes against the adjustment armature and causes the adjustment armature to move in a first vertical direction. The calibration screw may be turned in a second rotational direction to move the calibration screw out of the housing such that the calibration screw releases the adjustment armature and causes the adjustment armature to move in a second vertical direction.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
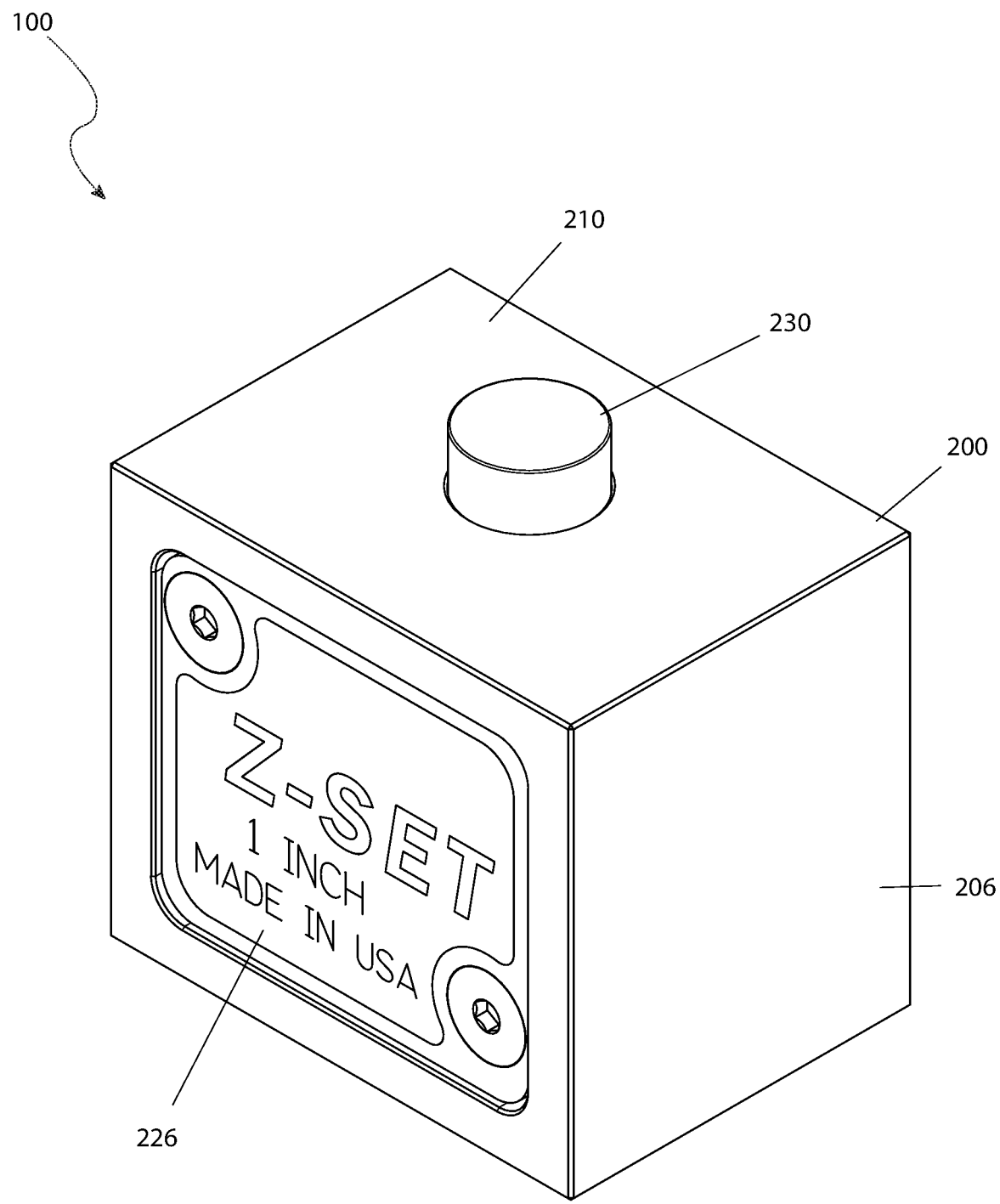
FIG. 1 is a top isometric view of a Z-axis setting device, according to an embodiment of the present invention.
Figure 2:
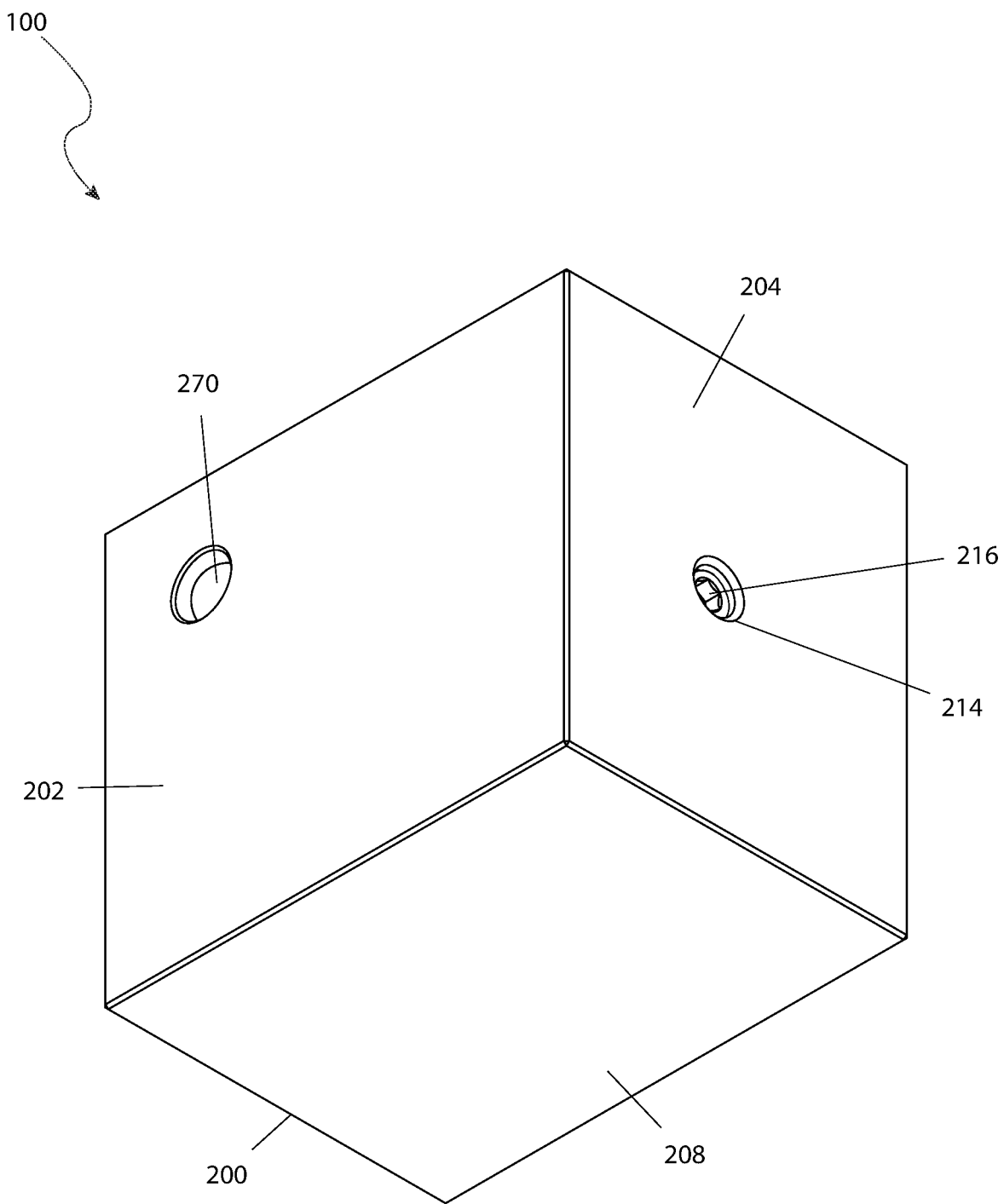
FIG. 2 is a bottom reverse isometric view of a Z-axis setting device, according to an embodiment of the present invention.
Figure 3:
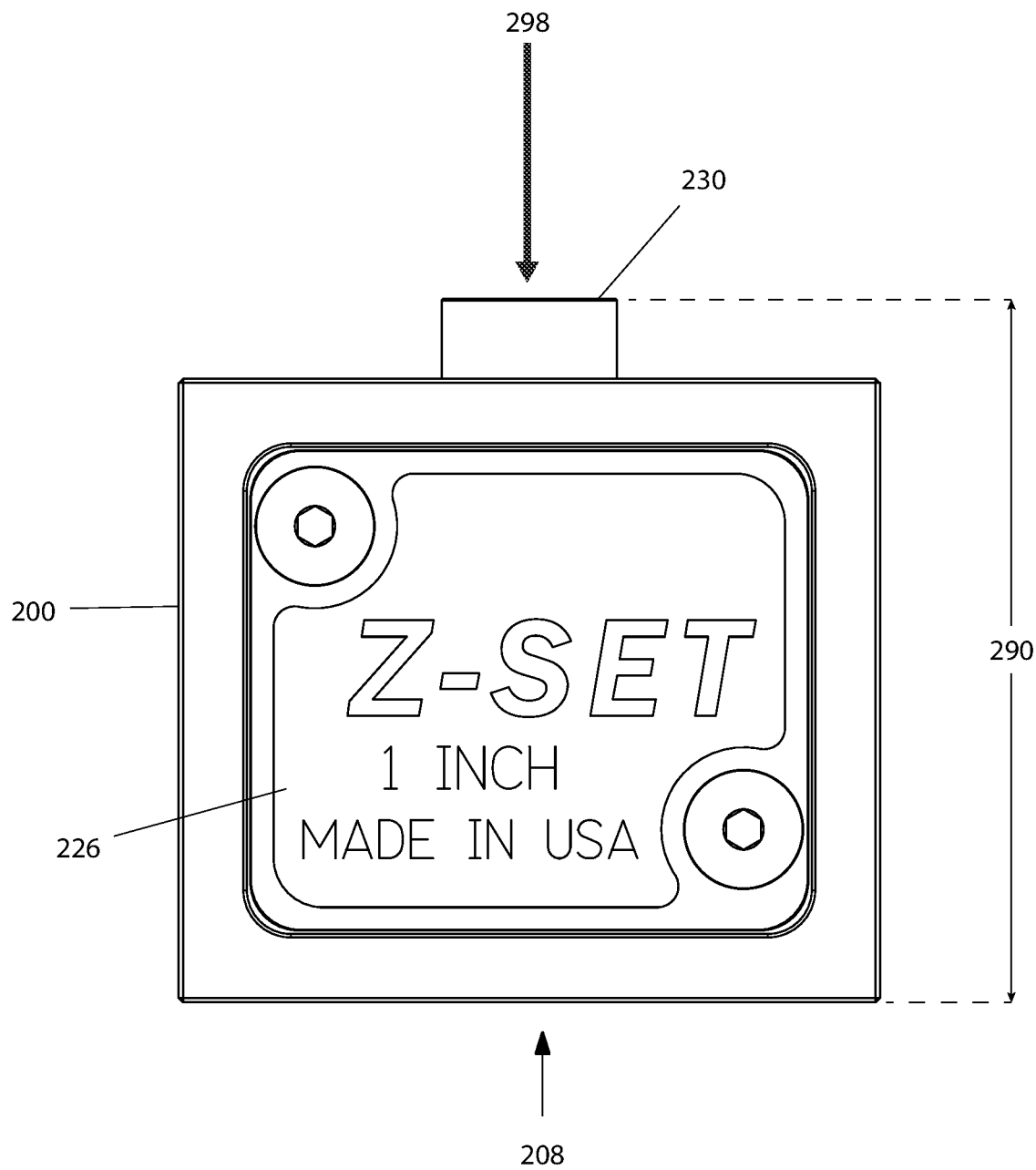
FIG. 3 is a front view of a Z-axis setting device, according to an embodiment of the present invention.
Figure 4:
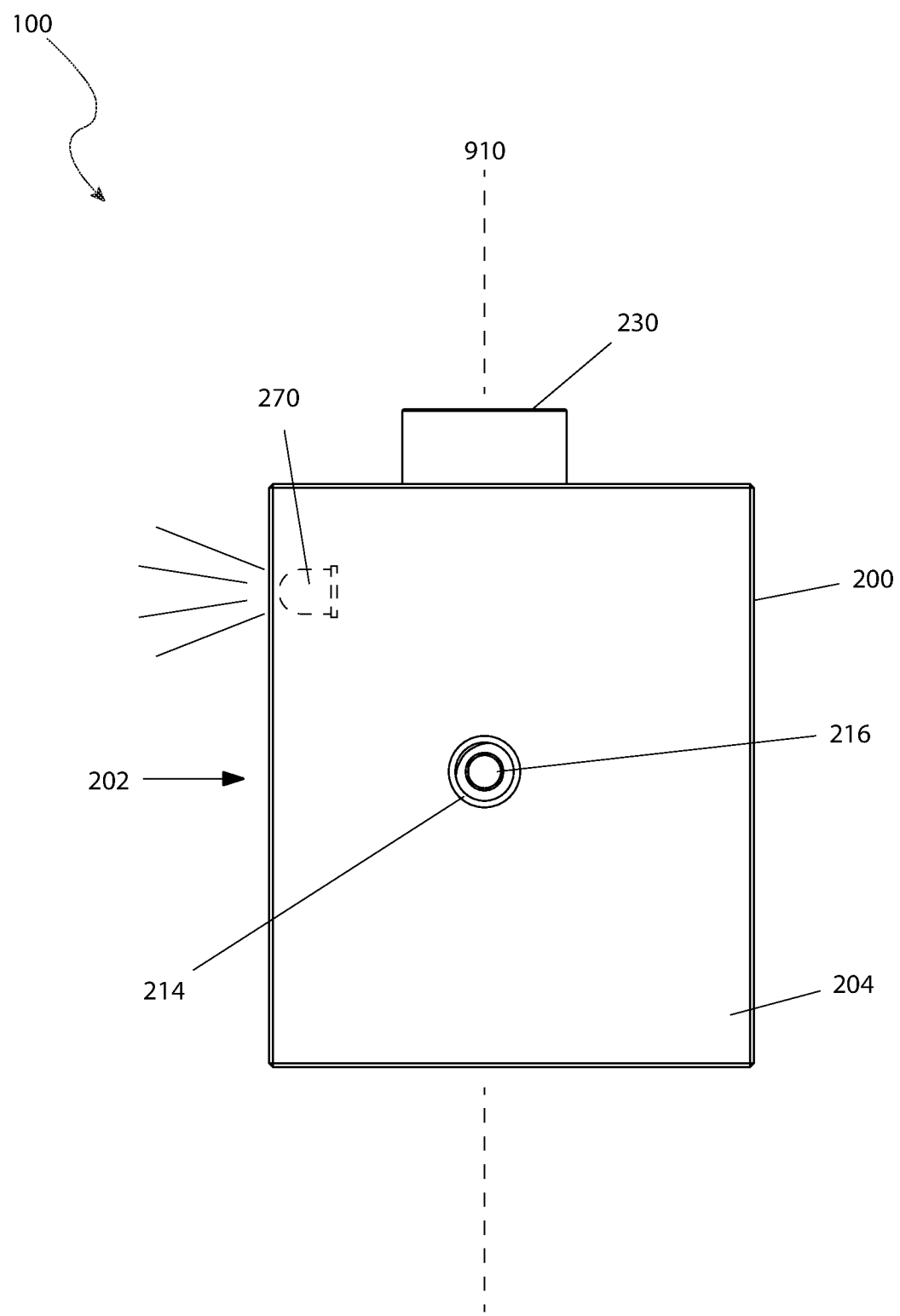
FIG. 4 is a left side view of a Z-axis setting device, according to an embodiment of the present invention.
Figure 5:
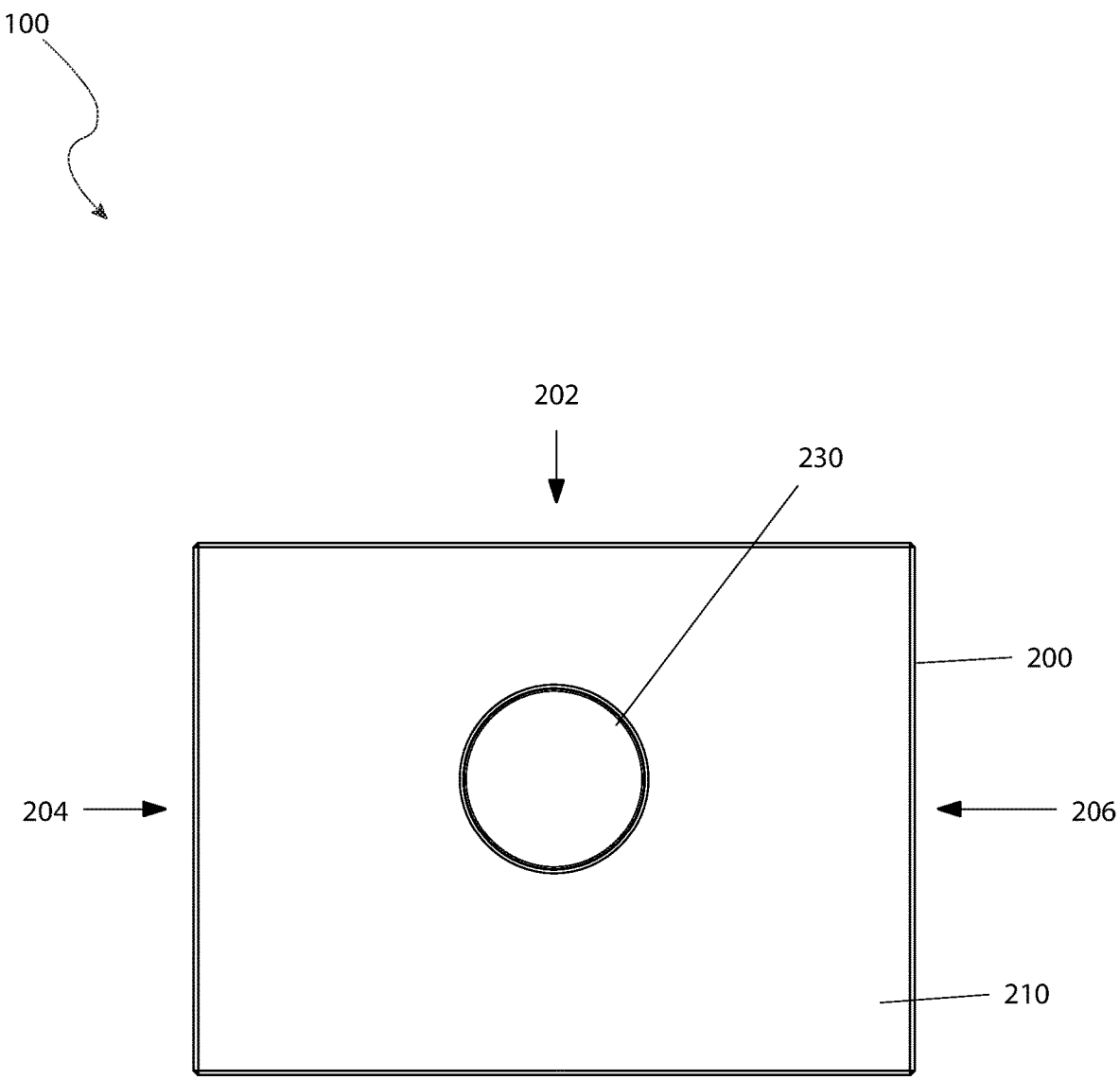
FIG. 5 is a top view of a Z-axis setting device, according to an embodiment of the present invention.
Figure 6:
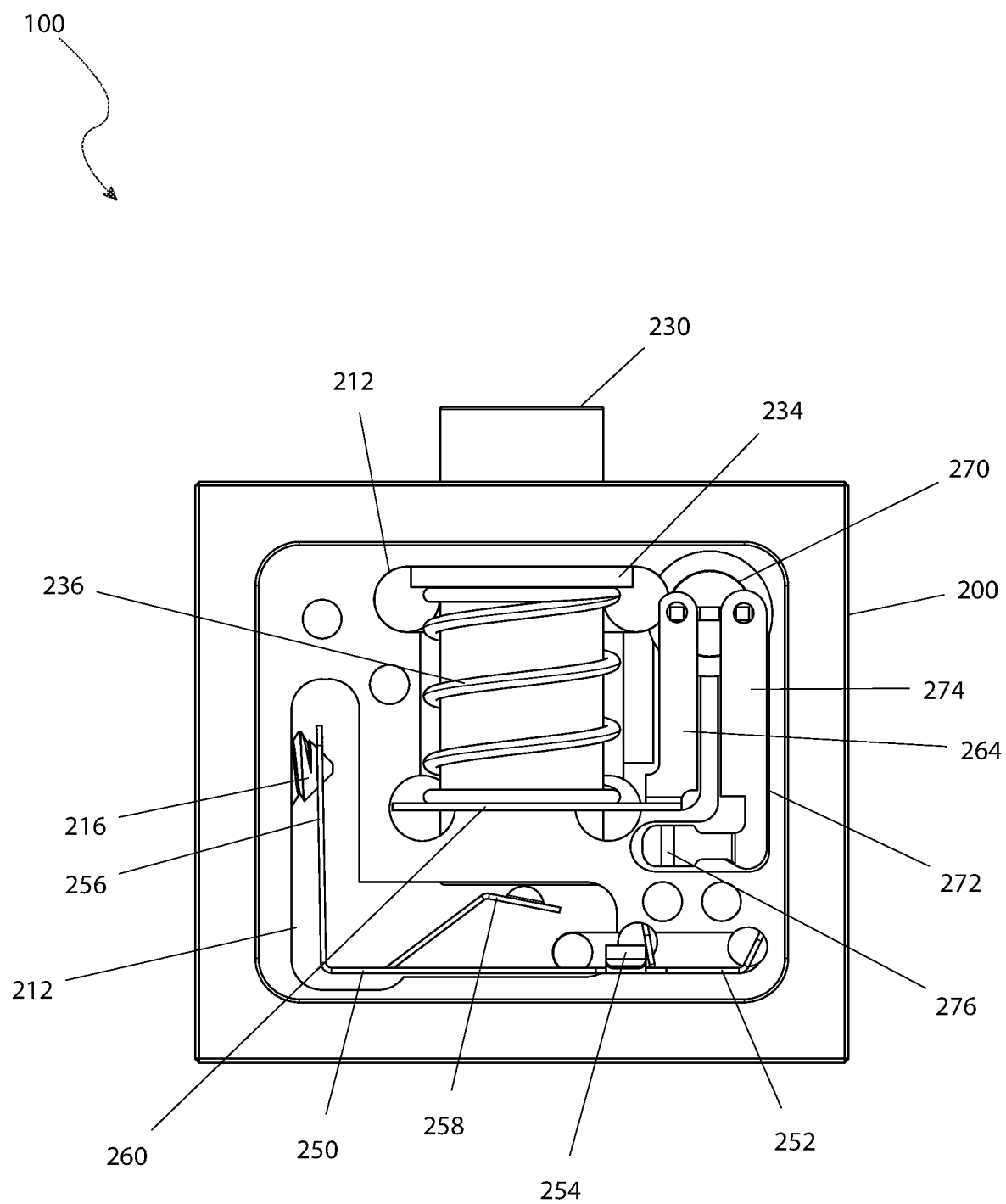
FIG. 6 is a front detail view of a Z-axis setting device, according to an embodiment of the present invention, illustrating internal components visible with the battery insert removed.
Figure 7:
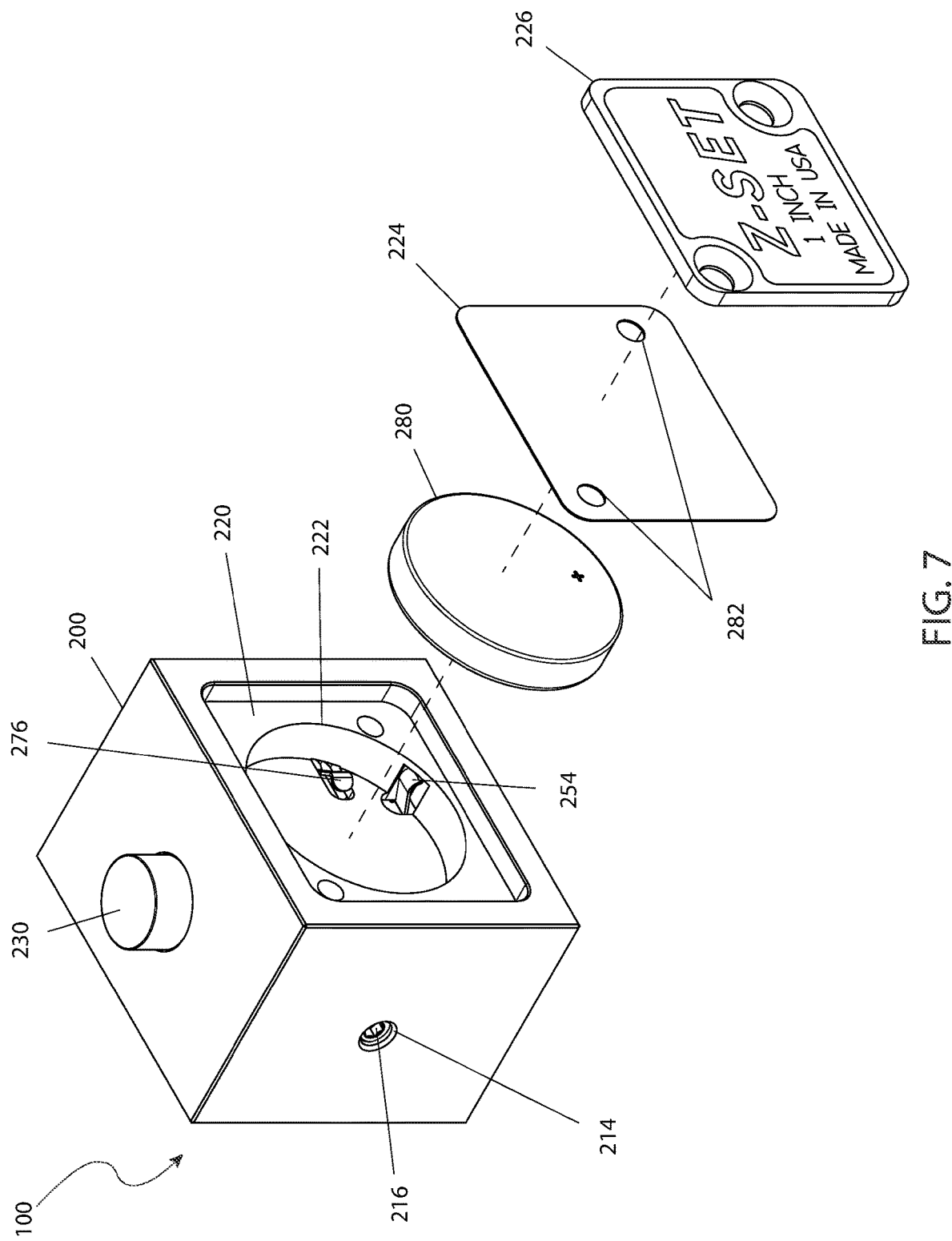
FIG. 7 is an exploded view of a Z-axis setting device, according to an embodiment of the present invention.

100 Z-axis setting device
200 housing
202 rear wall
204 left side wall
206 right side wall
208 bottom wall
210 top wall
212 circuit cavity
214 adjustment aperture
216 calibration screw
220 battery insert
222 battery cavity
224 battery insulator
226 cover plate
230 contact pin
234 retaining clip
236 main spring
250 contact spring
252 contact spring mount
254 positive battery terminal tang
256 adjustment armature
258 contact armature
260 spring plate
264 LED positive armature
270 LED lamp
272 negative terminal
274 LED negative armature
276 negative battery terminal tang
280 battery
282 pairs of holes
290 predetermined distance
298 external force
910 Z-axis

DESCRIPTION OF THE INVENTION

The present invention is directed to a Z-axis setting device (herein described as the "invention") 100. The invention 100 may comprise a housing 200, a contact pin 230, an electrical circuit, an LED lamp 270, and a battery 280. The invention 100 may be a tool for calibrating a Z-axis 910 of a cutting tool. The invention 100 may be placed on a supporting surface under a bit of the cutting tool. The bit of the cutting tool may be lowered to press the contact pin 230 causing the LED lamp 270 to illuminate. Illumination of the LED lamp 270 may indicate that the distance between the supporting surface and the bit is a predetermined distance 290. In a preferred embodiment, the predetermined distance 290 may 170 be one (1) inch. As non-limiting examples, the supporting surface may be a table of the cutting tool or a material to be cut.

The housing 200 may be an enclosure for the electrical circuit. The housing 200 and the contact pin 230 may define the predetermined distance 290 at which the LED lamp 270 illuminates. The housing 200 may comprise a rear wall 202, a left side wall 204, a right side wall 206, a bottom wall 208, and a top wall 210. A battery insert 220 and a cover plate 226 may comprise the front of the housing 200. The housing 200 may comprise a circuit cavity 212 which may be within the hollow interior of the housing 200. In a preferred embodiment, the housing 200 may be made of anodized aluminum.

The contact pin 230 may be a vertically-oriented cylindrical rod. The contact pin 230 may be slidably coupled to the housing 200 and may be free to move up and down through an aperture located on the top wall 210. The contact pin 230 may emerge from the top of the housing 200 and may extend above the top wall 210 of the housing 200.

The contact pin 230 may comprise a groove that may transversely encircle the contact pin 230. A retaining clip 234 may couple to the groove such that the top of a main spring 236 may push up against the retaining clip 234 in order to lift the contact pin 230. The retaining clip 234 may limit downward motion of the contact pin 230 such that damage to a contact spring 250 from downward movement of the contact pin 230 is prevented.

The main spring 236 may be positioned within the circuit cavity 212 between a spring plate 260 and the retaining clip 234. The main spring 236 may push the contact pin 230 up such that the retaining clip 234 presses against the top of the circuit cavity 212. An external force 298 pushing down on the contact pin 230 may force the contact pin 230 to move down. The contact pin 230 may move down into contact with the contact spring 250 in order to complete an electrical path through the electrical circuit causing the LED lamp 270 to illuminate.

The contact spring 250 may comprise a contact spring mount 252, a positive battery terminal tang 254, a contact armature 258, and an adjustment armature 256. The contact spring mount 252 may retain the contact spring 250 in place within the circuit cavity 212. The positive battery terminal tang 254 may extend forward through the battery insert 220 such that the positive battery terminal tang 254 makes contact with a positive case of the battery 280.

The contact armature 258 may extend upwards from the left side of the contact spring 250 at an oblique angle such that the end of the contact armature 258 is position below the contact pin 230. The contact pin 230 may be pushed downwards to make contact with the contact armature 258, thus completing the electrical path between the contact pin 230 and the positive case of the battery 280. The adjustment armature 256 may extend to the left of the contact spring mount 252 and then upwards adjacent to the left side wall 204. The upper end of the adjustment armature 256 may be positioned adjacent to an adjustment aperture 214 that is located on the left side wall 204.

A calibration screw 216 may be threadedly coupled to the adjustment aperture 214. The calibration screw 216 may push against the adjustment armature 256 to raise and lower the point where the contact pin 230 contacts the contact armature 258. The calibration screw 216 may be turned in a first rotational direction to move the calibration screw 216 into the housing 200 such that the calibration screw 216 may push against the adjustment armature 256 and may cause the adjustment armature 256 to in a first vertical direction. The calibration screw 216 may be turned in a second rotational direction to move the calibration screw 216 out of the housing 200 such that the calibration screw 216 may release the adjustment armature 256 and may cause the adjustment armature 256 to move in a second vertical direction.

The spring plate 260 may be positioned within the housing 200 at the lower end of the contact pin 230. The bottom of the main spring 236 may press against the spring plate 260. The electrical path may pass from the contact spring 250 to the spring plate 260 via the contact pin 230, the retaining clip 234, and the main spring 236. The spring plate 260 may comprise a pin aperture through which the contact pin 230 may pass as the contact pin 230 is moved downwards. The spring plate 260 may comprise an LED positive armature 264 that may extend upwards to electrically couple to the anode of the LED lamp 270.

A negative terminal 272 may be positioned within the housing 200 adjacent to the right side wall 206. The negative terminal 272 may comprise an LED negative armature 274 and a negative battery terminal tang 276. The LED negative armature 274 may be electrically coupled to the cathode of the LED lamp 70. The negative battery terminal tang 276 may extend forward through the battery insert 220 such that the negative battery terminal tang 276 makes contact with a negative case of the battery 280.

The LED lamp 270 may be illuminated by energizing the LED lamp 270 using an electrical current. The LED lamp 270 may be mounted to the rear wall 202 of the housing 200 such that the LED lamp 270 is visible on the rear wall 202 from outside of the invention 100. The LED lamp 270 may be energized by pressing the contact pin 230 down against the contact spring 250 to complete the electrical path indicating that the distance from the bottom of the housing 200 to top of the contact pin 230 matches the predetermined distance 290.

The battery 280 may comprise one or more energy-storage devices. The battery 280 may be a source of electrical energy to operate the LED lamp 270. The battery 280 may reside a battery cavity 222 of the battery insert 220 and may be accessible by removing the cover plate 226 from the housing 200. In some embodiments, a battery insulator 224 may electrically insulate the battery 280 from the cover plate 226.

With the contact pin 230 electrically contacting the contact spring 250, the LED lamp 270 may be illuminated by the electrical path from the positive case of the battery 280, through the contact spring 250, through the contact pin 230, through the retaining clip 234, through the main spring 236, through the spring plate 260, to the anode of the LED lamp 270, through the LED lamp 270, and continuing from the cathode of the LED lamp 270, through the negative terminal 272, to the negative case of the battery 280.

In some embodiments, pairs of holes 282 in the housing 200, the battery insert 220, the battery insulator 224, and the cover plate 226 may align such that a pair of screws may retain the battery 280 within the battery cavity 222.

In a preferred embodiment, the predetermined distance 290 may be one (1) inch. Alternatively, the predetermined distance 290 may be twenty-five (25) millimeters. Those of ordinary skill in the art will recognize that other distance targets for the predetermined distance 290 are conceivable and that such other distance targets fall within the spirit and scope of the present invention as defined in the following claims.

In use, the invention 100 may be operable to determine when the bit of the cutting tool is separated from the supporting surface by the predetermined distance 290. The invention 100 may be calibrated before use to assure that the LED lamp 270 illuminates when the distance from the bottom of the housing 200 to the top of the contact pin 230 matches the predetermined distance 290. As a non-limiting example, the gap between the spindle and the anvil of a micrometer may be set to precisely the predetermined distance 290. The contact pin 230 may be depressed and the invention 100 may be placed in the micrometer, which will retain the contact pin 230 at a height corresponding to the predetermined distance 290. The calibration screw 216 may be rotated in the first rotational direction and/or the second rotational direction to find the point where the LED lamp 270 transitions between being illuminated and being extinguished. The invention 100 may then be 285 removed from the micrometer and the bottom of the housing 200 may be placed on the supporting surface. The cutting tool may then be adjusted to bring the bit down onto the contact pin 230 to the point where the LED lamp 270 is illuminated. At that point, the Z-axis 910 of the cutting tool is properly referenced to the predetermined distance 290.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A Z-axis setting device comprising:
a housing having a rear wall, a left side wall, a right side wall, a bottom wall, a top wall, a circuit cavity disposed within a hollow interior of the housing, a battery insert disposed at a front of the housing, and a removable cover plate coupled to the battery insert;
a contact pin comprising a vertically-oriented cylindrical rod slidably coupled to the housing and extending upward through an aperture in the top wall of the housing, the contact pin comprising a groove that transversely encircles the contact pin;
a retaining clip coupled to the groove;
a main spring positioned within the circuit cavity of the housing between the retaining clip and a spring plate disposed below the contact pin, the main spring configured to bias the contact pin upward such that the retaining clip presses against an upper surface of the circuit cavity;
a contact spring mounted within the circuit cavity, the contact spring comprising a contact spring mount, a positive battery terminal tang extending forward through the battery insert, a contact armature extending obliquely upward toward the contact pin, and an adjustment armature extending adjacent to the left side wall of the housing;
a calibration screw threadedly coupled to an adjustment aperture in the left side wall of the housing, the calibration screw configured to push against the adjustment armature to raise or lower a point of contact between the contact pin and the contact armature;
an LED lamp mounted to the rear wall of the housing and having an anode and a cathode;
a negative terminal positioned within the housing adjacent to the right side wall, the negative terminal comprising an LED negative armature electrically coupled to the cathode of the LED lamp and a negative battery terminal tang extending forward through the battery insert; and,
a battery positioned within a battery cavity of the battery insert, the battery comprising a positive case in contact with the positive battery terminal tang and a negative case in contact with the negative battery terminal tang, the battery being removable by detaching the cover plate; and, wherein depression of the contact pin against the bias of the main spring causes the contact pin to contact the contact armature to complete an electrical path extending from the positive case of the battery, through the positive battery terminal tang, through the contact spring, through the contact pin, through the retaining clip, through the main spring, through the spring plate, through the LED positive armature to the anode of the LED lamp, through the LED lamp, through the LED negative armature, and through the negative battery terminal tang to the negative case of the battery, thereby illuminating the LED lamp; and, wherein illumination of the LED lamp indicates that a distance between the bottom wall of the housing and an upper surface of the contact pin corresponds to a predetermined distance.

2. The Z-axis setting device of claim 1, wherein:

the predetermined distance is one inch, the calibration screw is configured to be rotated in a first rotational direction to move inwardly into the housing and urge the adjustment armature upward to change the point of electrical contact between the contact pin and the contact armature, and rotated in a second rotational direction to move outwardly from the housing and release the adjustment armature to allow the adjustment armature to move downward; and, the LED lamp is visible on the exterior of the rear wall of the housing such that illumination is observable by a user during calibration and operation, and a battery insulator is interposed between the battery and the cover plate to electrically isolate the battery from the cover plate.

* * * * *